United States Patent
Zhong et al.

(10) Patent No.: US 12,114,107 B2
(45) Date of Patent: Oct. 8, 2024

(54) PROJECTOR KEYSTONE CORRECTION METHOD, APPARATUS AND SYSTEM, AND READABLE STORAGE MEDIUM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Jinqing Yu, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 25 days.

(21) Appl. No.: 17/602,292

(22) PCT Filed: Mar. 13, 2020

(86) PCT No.: PCT/CN2020/079164
§ 371 (c)(1),
(2) Date: Oct. 8, 2021

(87) PCT Pub. No.: WO2021/103347
PCT Pub. Date: Jun. 3, 2021

(65) Prior Publication Data
US 2022/0286654 A1    Sep. 8, 2022

(30) Foreign Application Priority Data
Nov. 27, 2019  (CN) .......................... 201911182586.7

(51) Int. Cl.
*H04N 9/31*    (2006.01)
*H04N 23/10*   (2023.01)

(52) U.S. Cl.
CPC ......... *H04N 9/3185* (2013.01); *H04N 9/3194* (2013.01); *H04N 23/10* (2023.01)

(58) Field of Classification Search
CPC .. H04N 9/3185; H04N 9/3194; G03B 21/147; G06T 7/30; G06T 7/70; G06T 7/73; G06T 7/80
See application file for complete search history.

(56) References Cited

U.S. PATENT DOCUMENTS 8,272,746 B2   9/2012  Furui
8,322,863 B1   12/2012 Cho
(Continued)

FOREIGN PATENT DOCUMENTS

CN    101697233 A    4/2010
CN    108289208 A    7/2018
(Continued)

OTHER PUBLICATIONS

The ESR of family EP application issued on Nov. 15, 2022.
The first OA of family JP application issued on Sep. 16, 2022.

*Primary Examiner* — Michael E Teitelbaum
*Assistant Examiner* — Humam M Satti
(74) *Attorney, Agent, or Firm* — Samson G. Yu (57) ABSTRACT

Disclosed is a projector keystone correction method, including: obtaining first coordinate values of a plurality of position points on a projective plane through an RGBD (Red, Green, Blue-Depth) camera in a first coordinate system; determining second coordinate values of the position points according to a predetermined conversion relation and the first coordinate values in a second coordinate system; and using an included angle between a fitted plane obtained by fitting according to the second coordinate values of the plurality of position points and a coordinate plane of the second coordinate system to achieve keystone correction.

14 Claims, 5 Drawing Sheets

(56) References Cited

U.S. PATENT DOCUMENTS

| | | | |
|---|---|---|---|
| 9,759,548 B2 | 9/2017 | Sumiyoshi | |
| 2002/0021418 A1* | 2/2002 | Raskar | H04N 9/3185 353/69 |
| 2005/0168705 A1* | 8/2005 | Li | H04N 5/74 353/69 |
| 2017/0180689 A1* | 6/2017 | Morrison | H04N 9/3194 |
| 2018/0278905 A1 | 9/2018 | Nakazawa | |
| 2019/0146313 A1* | 5/2019 | De La Cruz | G03B 21/142 345/581 |
| 2019/0364253 A1* | 11/2019 | Miyatani | H04N 9/3147 |
| 2022/0030206 A1* | 1/2022 | Ikeda | H04N 9/3173 |

FOREIGN PATENT DOCUMENTS

| | | |
|---|---|---|
| CN | 109983401 A | 7/2019 |
| CN | 110099267 A | 8/2019 |
| CN | 110336987 A | 10/2019 |
| CN | 110677634 A | 1/2020 |
| JP | 2004260785 A | 9/2004 |
| JP | 2010050540 A | 3/2010 |
| JP | 2010130225 A | 6/2010 |
| JP | 2010183219 A | 8/2010 |
| JP | 2013187764 A | 9/2013 |

\* cited by examiner

PROJECTOR KEYSTONE CORRECTION METHOD, APPARATUS AND SYSTEM, AND READABLE STORAGE MEDIUM

TECHNICAL FIELD

The disclosure relates to the technical field of optical instruments, in particular to a projector keystone correction method, a projector keystone correction apparatus, a projector keystone correction system, and a computer-readable storage medium.

BACKGROUND

With the development of multimedia technologies, projectors have been widely used in various occasions such as education training, company meetings, and home theaters. However, when the projectors project pictures, due to many uncertain factors in projection environments, the projected pictures are often distorted. For example, under normal circumstances, pictures projected by the projectors are rectangular, but may become non-rectangular quadrilaterals such as trapezoids due to factors that the projectors are tilted in position, projection directions cannot be completely perpendicular to projective planes, and the like, thereby seriously affecting viewing effects for users.

Thus, before using the projectors, it is inevitable that the projection pictures of the projectors need to be corrected. At present, most methods of performing keystone correction on the projectors require complex geometric calculations to obtain deflections of the projectors relative to the projective planes, so as to achieve keystone correction.

SUMMARY

The objective of the disclosure is to provide a projector keystone correction method, a projector keystone correction apparatus, a projector keystone correction system, and a computer-readable storage medium, which can easily and quickly achieve correction of a projection picture of a projector and provide a good projection picture for a user.

In order to solve the above technical problem, the disclosure provides a projector keystone correction method, including the following operating steps.

A Red, Green, Blue-Depth (RGBD) camera is used for shooting to obtain first coordinate values of a plurality of position points on a projective plane of a projection optical engine, in a first coordinate system, wherein the first coordinate system is a space rectangular coordinate system in an optical system of the RGBD camera.

According to a predetermined conversion relation between the first coordinate system and a second coordinate system and the first coordinate values, second coordinate values of the position points are determined in the second coordinate system, wherein the second coordinate system is the space rectangular coordinate system in an optical system of the projection optical engine.

Plane fitting is performed on the second coordinate values of the plurality of position points to obtain a fitted plane.

Keystone correction is performed on the projection optical engine according to an included angle between the fitted plane and a coordinate plane of the second coordinate system.

In this application, the technology that the RGBD camera can obtain a distance between each point in a captured image and the RGBD camera is fully utilized, and the RGBD camera is used to shoot an image on a projective plane required to be projected by the projection optical engine, and obtain position information of the plurality of position points on the projective plane relative to the RGBD camera. In conjunction with the principle that relative attitude between the projection optical engine and the RGBD camera does not change after the projection optical engine is in use, position information of the position points relative to the projection optical engine, i.e., coordinate information of the position points in a coordinate system of the projection optical engine, is obtained, to determine a deflection of the projection optical engine, thereby performing keystone correction on the projection optical engine according to the deflection. The whole process is easy and quick, and can accurately and efficiently achieve keystone correction of the projection optical engine.

In an alternative embodiment of this application, a process of predetermining a conversion relation includes the following steps.

An original image with feature points is projected onto a projection screen through the projection optical engine in advance, to obtain projective points of the feature points on the projection screen.

The RGBD camera is used to shoot to obtain projective point first coordinate values of the projective points, in the first coordinate system.

According to a pinhole imaging principle that is satisfied between the projective points and the feature points, as well as a conversion relation that is satisfied between the coordinate values of the projective points, in the first coordinate system and the second coordinate system, a correspondence relation that is satisfied between the projective point first coordinate values and feature point coordinate values is determined as wherein $(u,v)^T = F(R, t, f_x, f_y, c_x, c_y) \cdot (x,y,z)^T$, wherein $(u,v)^T$ is a column vector of the feature point coordinate values of each feature point in a pixel coordinate system of the projection optical engine, $(x, y, z)^T$ is a column vector of the first coordinate values of each projective point, $F(R, t, f_x, f_y, c_x, c_y)$ is a function about R, t, $f_x$, $f_y$, $c_x$, $c_y$, R and t are conversion parameters of the conversion relation, $f_x$ and $f_y$ are respectively a focal length parameter expressed in pixels in an x-axis direction and a focal length parameter expressed in pixels in a y-axis direction of the projection optical engine, and $c_x$ and $c_y$ are respectively an optical center parameter in the x-axis direction and an optical center parameter in the y-axis direction of the projection optical engine.

According to the correspondence relation as well as multiple sets of the projective point first coordinate values and the feature point coordinate values, a parameter R, t, $f_x$, $f_y$, $c_x$, $c_y$ is obtained.

In the embodiment, the projection optical engine projects a pattern with a large number of feature points; according to the pinhole imaging principle that is stratified between the feature points on the original image and the projective points on the projection picture of the projection optical engine, as well as the conversion relation that is satisfied between the coordinates, in the first coordinate system of the RGBD camera, and the coordinate values of the projective points in the second coordinate system of the projection optical engine, the correspondence relation between the projective point first coordinate values captured by the RGBD camera and the feature point coordinate values of the feature points in the original image is built in the pixel coordinate system. Using the correspondence relation, intrinsic parameters of the projection optical engine and extrinsic parameters between the projection optical engine and the RGBD camera are solved, so that the predetermined conversion relation between the first coordinate system and the second coordinate system is determined.

Before using the projection optical engine, a specific projection environment that is simple and easy to operate is established. Solving processes of various parameters are achieved based on a camera calibration principle, thereby providing effective parameters for subsequent use of the projector, simplifying an operating process during subsequent application of the projection optical engine, and accelerating a keystone correction process of the projector.

In another alternative embodiment of this application, after the step of determining second coordinate values of the position points in the second coordinate system, the method further includes the following steps.

Based on the pinhole imaging principle and the plurality of second coordinate values, a projection area of the projection optical engine is determined.

A largest pure-color area or a curtain area is identified in a projective plane image captured by the RGBD camera, a target projection area of the projection optical engine is determined, and the step of performing plane fitting on the second coordinate values of the plurality of position points is then executed.

The step of performing keystone correction on the projection optical engine according to an included angle between the fitted plane and a coordinate plane of the second coordinate system includes the following step.

Keystone correction is performed on the projection optical engine and an actual projection area of the projection optical engine is allowed to fully fall into the target projection area.

In the embodiment, classifying of the target projection area is performed before keystone correction, so that the projection optical engine can adaptively select a proper projection area in the keystone correction process, and environmental influences are further reduced.

In another alternative embodiment of this application, the step of performing plane fitting on the second coordinate values of the plurality of position points includes the following steps.

Position points out of the target projection area are rejected.

Plane fitting is performed according to second coordinate values of position points located in the target projection area.

Considering that the target area is determined based on the pure-color area or the curtain identified by the RGBD camera, that is, the target area is an area where the projection optical engine needs to project finally, also the target projection area is an area suitable for projection without environmental interference, external environmental interference to the fitted plane fitted by the position points in the target projection area can be eliminated, and the problem that the fitted plane obtained finally is low in precision due to the fact that the position points at occlusion portions involve in the plane fitting is avoided.

In another alternative embodiment of this application, after the step of performing keystone correction on the projection optical engine according to an included angle between the fitted plane and a coordinate plane of the second coordinate system, the method further includes the following step.

According to an included angle between a direction of an acceleration detected by a gyroscope arranged in the projection optical engine and a projection direction of the projection optical engine, an angle of rotation of the projection optical engine along an optical axis direction is adjusted.

In addition to correcting the shape of the projection area, the gyroscope is also used to adjust a pitch angle of the projection optical engine, so as to achieve a better adjustment of the projection picture during projection of the projector, thereby ensuring a projection effect of the projector and improving the projection effect of the projector.

This application further provides a projector keystone correction apparatus, including a first coordinate module, a second coordinate module, a plane fitting module, and a keystone correction module.

The first coordinate module which is configured to use a RGBD camera to shoot to obtain first coordinate values of a plurality of position points on a projective plane of a projection optical engine in a first coordinate system, wherein the first coordinate system is a space rectangular coordinate system in an optical system of the RGBD camera.

The second coordinate module which is configured to determine second coordinate values of the position points in a second coordinate system, according to a predetermined conversion relation between the first coordinate system and the second coordinate system, wherein the second coordinate system is the space rectangular coordinate system in an optical system of the projection optical engine.

The plane fitting module which is configured to perform plane fitting on the second coordinate values of the plurality of position points to obtain a fitted plane.

The keystone correction module which is configured to perform keystone correction on the projection optical engine according to an included angle between the fitted plane and a coordinate plane of the second coordinate system.

The embodiment is an embodiment of a software module corresponding to the foregoing projector keystone connection method, and its technical effects are similar to the technical solutions and the technical effects of the foregoing keystone correction method, which will not be elaborated here.

This application further provides a projector keystone correction system, including a projection optical engine, an RGBD camera, and a processor.

The projection optical engine which is configured to project a projection picture.

The RGBD camera which is configured to shoot a plane where the projection picture is located.

The processor which is connected to the projection optical engine and the RGBD camera and configured to perform operating steps of the projector keystone correction method as claimed in claim 1 based on the picture captured by the RGBD camera.

In the embodiment, the RGBD camera, the projection optical engine, and the processor cooperate mutually. The RGBD camera shoots the projection picture projected by the projection optical engine.

The processor is configured to perform the operating steps of the projector keystone correction method based on depth information of the position points on the projection picture captured by the RGBD camera, so as to simply and accurately achieve keystone correction of the projector optical engine, thereby bringing better viewing effects to a user.

In another alternative embodiment of this application, the RGBD camera refers to any of a structured light camera, a tof camera, or a binocular camera.

In another alternative embodiment of this application, a gyroscope is arranged in the projector.

The angle of rotation of the projection optical engine along the optical axis is adjusted through the gyroscope, which further improves an adjustment effect of the projection optical engine.

This application further provides a computer readable storage medium. A computer program stored in the computer-readable storage medium may be executed to implement operating steps of the projector keystone correction method as described in any of the above.

When the computer program in the computer-readable storage medium provided in the embodiment is executed, keystone correction of the projection optical engine can be accurately effectively implemented.

BRIEF DESCRIPTION OF THE DRAWINGS

In order to describe the technical solutions in the embodiments of the disclosure or the related art more clearly, the drawings required to be used in descriptions about the embodiments or the related art will be simply introduced below. It is apparent that the drawings in the following descriptions are only some embodiments of the disclosure. Those of ordinary skill in the art may further obtain other drawings according to these drawings without creative work.

DETAILED DESCRIPTION OF THE EMBODIMENTS

The core of the disclosure is to provide a projector keystone correction method, a projector keystone correction apparatus, a projector keystone correction system, and a computer-readable storage medium, which can achieve keystone correction of a projector without complex geometric calculations.

In order to enable those skilled in the art to better understand the solutions of the disclosure, the disclosure will be further described in detail below with reference to the accompanying drawings and specific embodiments. It is apparent that the above described embodiments are only part of the disclosure, not all of the embodiments. All other embodiments obtained by those of ordinary skill in the art on the basis of the embodiments in the disclosure without creative work shall fall within the scope of protection of the disclosure.

Figure 1:
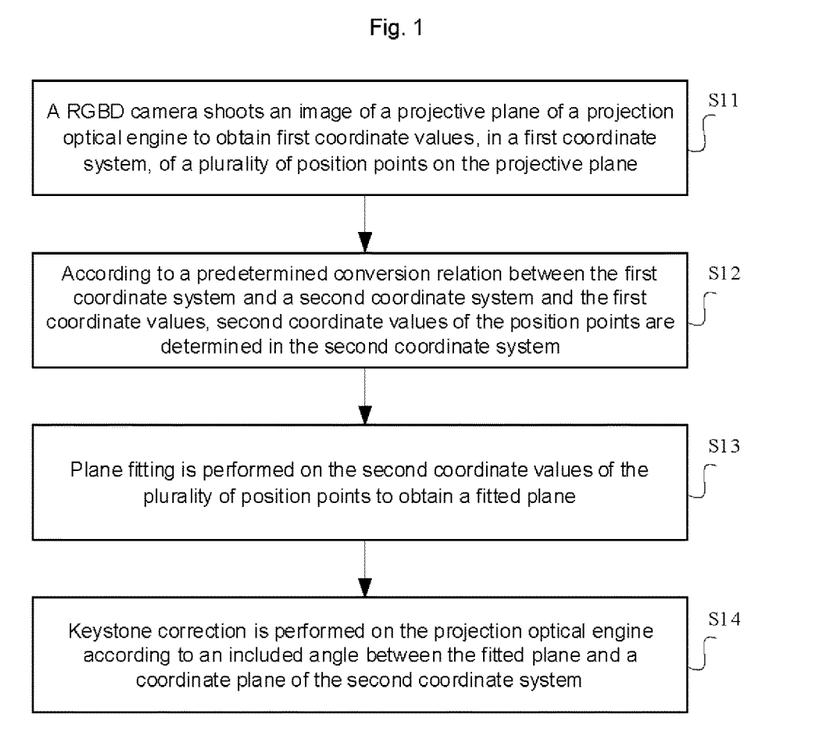
FIG. 1 is a schematic flowchart of a projector keystone correction method according to an embodiment of the application.

As shown in FIG. 1, FIG. 1 is a schematic flowchart of a projector keystone correction method according to an embodiment of the application. The method may include the following steps.

At S11, a Red, Green, Blue-Depth (RGBD) camera shoots an image of a projective plane of a projection optical engine to obtain first coordinate values of a plurality of position points on the projective plane in a first coordinate system.

It is to be noted that an optical axis direction of the RGBD camera and an optical axis direction of the projection optical engine are roughly the same. When the projection optical engine projects a projection picture onto the projective plane, the projection picture should be within an image captured by the RGBD camera.

Specifically, the projective plane refers to a plane on which the projector projects pictures. In the embodiment, when the RGBD camera shoots an image, the projection optical engine may project or not project onto the projective plane, which may not affect implementation of this application, as long as the image captured by the RGBD is the image on the plane of a projection picture that needs to be projected by the projection optical engine.

In addition, the first coordinate system is a space rectangular coordinate system in an optical system of the RGBD camera. That is, the first coordinate values are coordinate values of the position points on the projective plane in the space rectangular coordinate system of the RGBD camera. The three-dimensional rectangular coordinate system of the RGBD camera also refers to the first coordinate system, in which both an X-axis and a Y-axis are parallel to a side of an imaging plane of the RGBD camera, a Z-axis direction serves as an optical axis of the RGBD camera, and an origin is at an optical center position of a lens of the RGBD camera.

At S12, according to a predetermined conversion relation between the first coordinate system and a second coordinate system and the first coordinate values, second coordinate values of the position points are determined in the second coordinate system.

It is to be noted that the conversion relation between the first coordinate system and the second coordinate system is a conversion relation between two sets of coordinate values of a point in space, in the first coordinate system and the second coordinate system.

In addition, the second coordinate system is the space rectangular coordinate system in an optical system of the projection optical engine, with a z-axis along a projection direction of the projection optical engine and the optical center of the lens of the projection optical engine as the origin.

After the projector is actually put into use, relative position and attitude between the projector and the RGBD camera will no longer change, that is, the relative position relationship between the two is fixed, and the conversion relation between the first coordinate system and the second coordinate system is fixed. Thus, the conversion relation between the second coordinate system corresponding to the projection optical engine and the first coordinate system corresponding to the RGBD camera may be obtained in advance. According to the conversion relation, for any of position points on the projective plane, the coordinate value of the position point in the second coordinate system may be determined as the coordinate values of the point is known in the first coordinate system.

At S13, plane fitting is performed on the second coordinate values of the plurality of position points to obtain a fitted plane.

Normally, the projective plane is a plane. After the coordinate values of the plurality of position points on the plane are obtained in the second coordinate system, the projective plane may be fit in the second coordinate system, and an angle relation between the projective plane and the projection optical engine may be determined.

At S14, keystone correction is performed on the projection optical engine according to an included angle between the fitted plane and a coordinate plane of the second coordinate system.

Because the Z-axis of the second coordinate system and the optical axis of the projection optical engine coincide, the angle of rotation of the projective plane, along the X-axis as well as the Y-axis, relative to the second coordinate system may be determined after the fitted plane and the coordinate values in the second coordinate system are determined, so that keystone correction of the projection optical engine can be achieved.

In a conventional keystone correction process, a projection optical engine is generally required to project a projection picture with specific patterns onto a projective plane, a camera is used to shoot to obtain information of relative position among the specific feature points on the projection picture, and complex geometric operations are performed, so as to determine angle of deflection of the projection picture relative to the projection optical engine, thereby achieving keystone correction. However, in the method, the pattern projected by the projection optical engine is required to have specific feature points, and keystone correction is preformed based on the feature points. Once the feature points are partially occluded, low correction precision even failure in correction may be caused.

Therefore, in this application, when the RGBD camera shoots the projective plane, it does not need to identify certain specific position points, but only needs to obtain the position information of a large number of position points on the projective plane relative to the RGBD camera. Since the RGBD camera may be used to obtain depth information of the position points, the position points refer to points in any form, even including points in an indistinct pure-color area. In other words, keystone correction in this application does not depend on the image projected by the optical projector, and can be achieved even when the optical projector does not project the image, and accordingly the problem of projection occlusion can be completely avoided. After position coordinates of each position point on the projective plane relative to the projection optical engine are determined, the various position points are subjected to plane fitting to obtain the fitted plane. Since the fitted plane is obtained by fitting based on the coordinate values of each position point, in the projection optical engine corresponding to the second coordinate system, a relative position relation between the fitted plane and the coordinate plane of the second coordinate system, for example, an xoy plane, can be determined. As mentioned above, the Z-axis direction of the second coordinate system is the direction of a projection optical axis of the projection optical engine, so that the angle and direction of deflection of the fitted plane relative to the projection direction of the projection optical engine can be determined, and further based on the angle and direction of deflection, keystone correction of the projection optical engine can be achieved.

It is to be noted that the projector keystone correction method provided in this application can be widely applied to keystone correction of long-focal length projectors, short-focal length projectors, laser TVs, and other devices related to image projection, which is not specifically specified in this application.

In this application, according to the advantage that the RGBD camera can obtain the depth information of the position points in the projective plane, as well as the principle that the relative attitude between the RGBD camera and the projector does not change, the coordinate values of each position point are determined, in the three-dimensional rectangular coordinate system of the projection optical engine, that is, a relative position relation between each position point and the projection optical engine is determined. In addition, a relative position relation between the plane where each position point is located and the projection direction of the projection optical engine is determined by means of fitted plane. Geometric calculations are omitted. The projector does not need to project specific patterns. Thus, keystone correction of the projector can be quickly and effectively completed.

Figure 2:
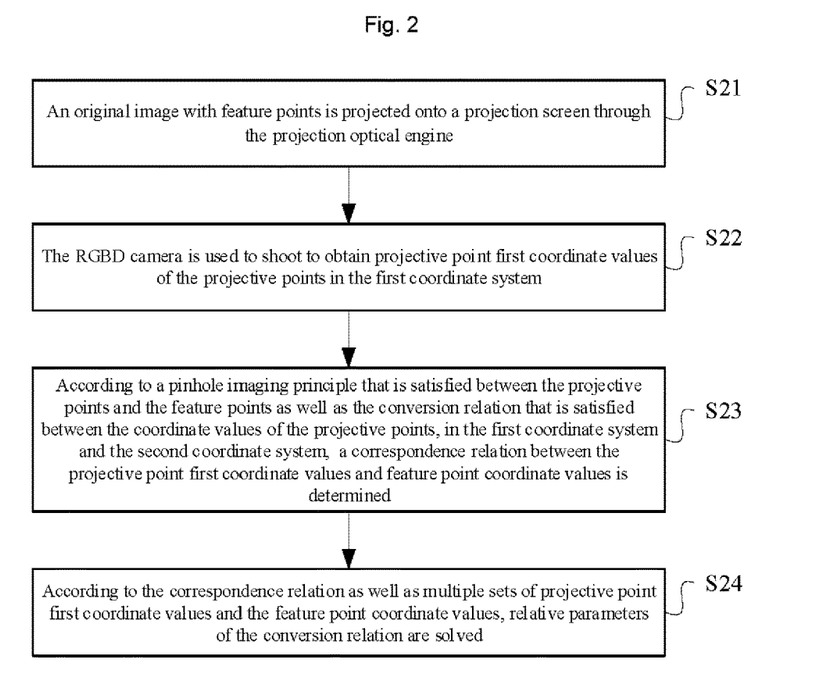
FIG. 2 is a schematic flowchart of determining a conversion relation according to an embodiment of this application.

As mentioned above, in this application, the relative position and attitude between the RGBD camera and the projection optical engine is required to be predetermined to determine the conversion relation between the first coordinate system and the second coordinate system. The process of determining the conversion relation in S13 in this application will be described below through specific embodiments. As shown in FIG. 2, FIG. 2 is a schematic flowchart of determining a conversion relation according to an embodiment of this application. The process may include the following steps.

At S21, an original image with feature points is projected onto a projection screen through the projection optical engine.

It is to be noted that, the process of determining the conversion relation in the embodiment may be completed in the factory before the projector is put into use.

The original image with the feature points may be a checkerboard image or other array image with a large number of feature points, which is not specifically limited in this application.

At S22, the RGBD camera is used to shoot to obtain projective point first coordinate values of the projective points in the first coordinate system.

At S23, according to a pinhole imaging principle that is satisfied between the projective points and the feature points as well as the conversion relation that is satisfied between the coordinate values of the projective points, in the first coordinate system and the second coordinate system, a correspondence relation between the projective point first coordinate values and feature point coordinate values is determined.

Specifically, the feature point coordinate values are coordinate values of the feature points in the original image, in a pixel coordinate system of the projection optical engine.

At S24, according to the correspondence relation as well as multiple sets of projective point first coordinate values and the feature point coordinate values, relative parameters of the conversion relation are solved.

Figure 3:
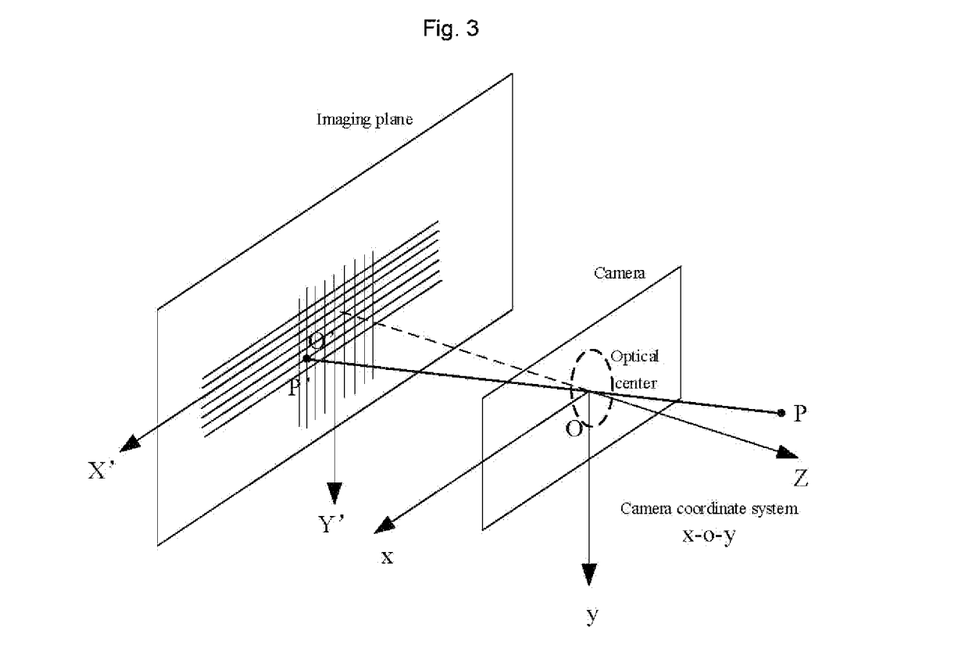
FIG. 3 is a schematic diagram of an optical path principle of a camera calibration principle.

Specifically, FIG. 3 is a schematic diagram of an optical path principle of the pinhole imaging principle. As shown in FIG. 3, based on the pinhole imaging principle, a point P in a camera coordinate system passes through the optical center of the camera, a point P' is imaged on an imaging plane of the camera, and coordinate values of the point P' in the pixel coordinate system of the camera and coordinate values of the point P in the camera coordinate system satisfy the geometric principle of similar triangles, that is, an x-axis coordinate and a y-axis coordinate of the point P and an x-axis coordinate and a y-axis coordinate of the point P' satisfy a certain proportional relation. Because the pinhole imaging principle is a mature optical model technology for optical devices, the coordinate relation that the P point and point P' satisfy in the two coordinate systems will not be deduced in detail here.

In the embodiment, coordinate values of the feature points in the original image of the projection optical engine are feature point coordinate values, in the pixel coordinate system of the projection optical engine, and coordinates, in the second coordinate system of the projection optical engine, of the projective points formed from the feature points in the original image, which are projected and imaged in the projection picture, are projective point second coordinate values. It is apparent that the feature points and the projective points are projected to each other based on the optical center of the lens of the projector. Correspondingly, the coordinate values of the feature points and the projective point second coordinate values also satisfy the pinhole imaging principle.

Figure 4:
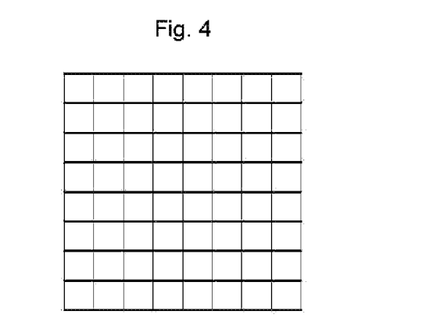
FIG. 4 is schematic diagram of an original image according to an embodiment of this application.

In actual selecting and setting of the original image, the checkerboard image shown in FIG. 4 may be selected. FIG. 4 is schematic diagram of an original image according to an embodiment of this application. Angular points in the checkerboard serve as feature points, which may achieve high resolution while ensuring sufficient number of the feature points.

A certain feature point in the original image is set as a point A. As the pixel coordinate system of the projection optical engine is a plane rectangular coordinate system, feature point coordinate values of the point A are set as (u, v), and projective point second coordinate values of a projective point $A_c$ are set as $(x_c, y_c, z_c)$.

Because the protective point coordinate values of $A_c$ are $(x_c, y_c, z_c)$, which are coordinate values in a three-dimensional rectangular coordinate system, and feature point coordinate values of the point A are (u,v), which are coordinate values in a two-dimensional rectangular coordinate system, the projective point coordinate values of the point $A_c$ are required to be converted into coordinates in the two-dimensional rectangular coordinate system. A conversion equation is as follows:

$$\begin{cases} x' = \dfrac{x_c}{z_c} \\ y' = \dfrac{y_c}{z_c} \end{cases};$$

after conversion, the projective point two-dimensional coordinate values of $A_c$ are (x', y').

Figure 5:
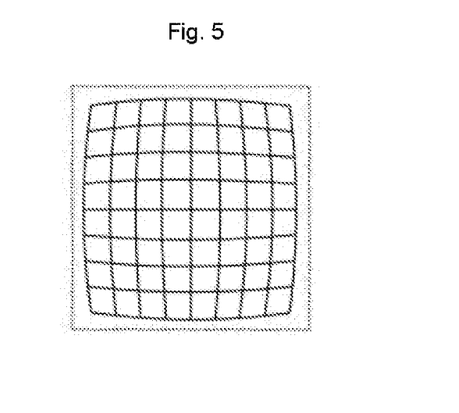
FIG. 5 is schematic diagram of a distorted image of the original image in FIG. 4.

Further, distortion from the point A to the point $A_c$ in the projection process of the projection optical engine is considered, as shown in FIG. 5, FIG. 5 is a schematic diagram of a distorted image of the original image in FIG. 4. Therefore, distortion correction is performed on the projective point two-dimensional coordinate values of $A_c$. Specific correction equations are as follows:

$$x'' = \frac{1 + k_1 r^2 + k_2 r^4 + k_3 r^6}{1 + k_4 r^2 + k_5 r^4 + k_6 r^6} + 2 p_1 x' y' + p_2 (r^2 + 2 x'^2) + s_1 r^2 + s_2 r^4; \text{ and}$$

$$y'' = \frac{1 + k_1 r^2 + k_2 r^4 + k_3 r^6}{1 + k_4 r^2 + k_5 r^4 + k_6 r^6} + 2 p_2 x' y' + p_1 (r^2 + 2 y'^2) + s_3 r^2 + s_4 r^4.$$

Thus, the projective point two dimensional coordinate values (x",y") of $A_c$ after distortion correction are obtained, where $r^2 = x'^2 + y'^2$, $k_1$, $k_2$, $k_3$, $k_4$, $k_5$, $k_6$, $p_1$, $p_2$, $s_1$, $s_2$, $s_3$ and $s_4$ are all constant parameters related to the projection optical engine.

Further, according to the foregoing pinhole imaging principle and the geometrical relationship that is satisfied between the coordinate values of the feature point A and the projective point $A_c$, an equation $$\begin{cases} u = f_x * x'' + c_x \\ v = f_y * y'' + c_y \end{cases}$$

can be obtained; wherein $f_x$ and $f_y$ are respectively a focal length parameter expressed in pixels in an x-axis direction and a focal length parameter expressed in pixels in a y-axis direction of the projection optical engine, and $c_x$ and $c_y$ are respectively an optical center parameter in the x-axis direction and an optical center parameter in the y-axis direction of the projection optical engine.

The coordinate values of the point $A_c$ in the first coordinate system corresponding to the RGBD camera, determined by shooting the projective point $A_c$ through the RGBD camera, are set as the projective point first coordinate values (x, y, z); the projective point first coordinate values and the projective point second coordinate values of the projective point $A_c$ are set to satisfy a conversion relation: $(x,y,z)^T = R \cdot (x_c, y_c, z_c)^T + t$; wherein $(x, y, z)^T$ is a column vector of the projective point first coordinate values, $(x_c, y_c, z_c)^T$ is a column vector of the projective point second coordinate values, R and t are conversion parameters of the conversion relation, and the conversion relation refers to a conversion relation between the first coordinate system and the second coordinate system.

Further, combining the conversion relation with the above derivation equation, the projective point first coordinate values of the projective point $A_c$ in the RGBD camera and the feature point coordinate values, in the pixel coordinate system of the RGBD camera, of the corresponding feature point in the original image may satisfy an equation: $(u,v)^T = F(R,t,f_x,f_y,c_x,c_y) \cdot (x,y,z)^T$; wherein $(u,v)^T$ is a column vector of the feature point coordinate values, and $F(R, t, f_x, f_y, c_x, c_y)$ is a function about R, t, $f_x$, $f_y$, $c_x$, $c_y$.

Because there are a large number of feature points in the original image, and the feature point coordinate values of the feature points are known in the pixel coordinate system, according to the feature point matching principle in the image, the corresponding projective point of each feature point in a projected image can be determined. The projective point first coordinate values of each projective point can be obtained through the RGBD camera in the first coordinate system, so that multiple sets of values $(u,v)^T$ and $(x,y,z)^T$ can be obtained. In conjunction with the foregoing derivation equations, parameters such as $k_1$, $k_2$, $k_3$, $k_4$, $k_5$, $k_6$, $p_1$, $p_2$, $s_1$, $s_2$, $s_3$, $s_4$, and R, t, $f_x$, $f_y$, $c_x$, $c_y$ can be solved.

Because R and t are conversion parameters of the conversion relation, after R and t are solved, a conversion relation between the first coordinate system and the second coordinate system can be determined, that is, a conversion relation of the coordinate values of one point in space is determined in two coordinate systems.

In the embodiment, the projection optical engine projects a pattern with a large number of feature points, according to the pinhole imaging principle that is stratified between the feature points on the original image and the projective points on the projection picture of the projection optical engine, as well as the relation between the coordinate values of the projective points, in the first coordinate system of the RGBD camera and the second coordinate system of the projection optical engine, a correspondence relation between the projective point first coordinate values captured by the RGBD camera and the feature point coordinate values of the feature points in the original image is built in the pixel coordinate system. Using the correspondence relation, intrinsic parameters of the projection optical engine and extrinsic parameters between the projection optical engine and the RGBD camera can be solved, so that the predetermined conversion relation between the first coordinate system and the second coordinate system can be determined.

Before using the projector, a specific projection environment that is simple and easy to operate is established. Solving processes of various parameters are realized based on a camera calibration principle, thereby providing effective parameters for subsequent use of the projector, simplifying an operating process during subsequent application of the projector, and accelerating a keystone correction process of the projector.

Based on any of the foregoing embodiments, it can be known that for the projector, the respective imaging position points projected onto the projective plane and the existing points in the original image in the projector also satisfy the pinhole imaging principle.

When projecting the points in the original image onto the projective plane is regarded as a projection mapping relation, then projection mapping points in the original image, corresponding to each position point within a projection area of the projection optical engine should all be concentrated in a small pixel area on a plane where the original image is located. The pixel area is an area where the original image is located, and pixel coordinate values of the projection mapping point located in the pixel area should also fall within the pixel area.

When the RGBD camera shoots an image of the projective plane, the captured image area is slightly larger than the projection area of the projection optical engine. Thus, when the projection mapping points corresponding to a position point on the projective plane captured by the RGBD camera are not located in the pixel area, it means that the position point is not located in the projection area of the projection optical engine.

Thus, in another specific embodiment of this application, after the above S12 and before the S13, that is, after the corresponding second coordinate values are determined according to the first coordinate values of each position point on the projective plane obtained by the RGBD camera, and before plane fitting is performed according to the multiple second coordinate values, the following may be further included.

Based on the pinhole imaging principle and the plurality of second coordinate values, a projection area of the projection optical engine is determined.

A largest pure-color area or a curtain area is identified in a projective plane image captured by the RGBD camera, a target projection area of the projection optical engine is determined, and the step of performing plane fitting on the second coordinate values of the plurality of position points is then executed.

The step of performing keystone correction on the projection optical engine based on an included angle between the fitted plane and a coordinate plane of the second coordinate system includes the following steps.

Keystone correction is performed on the projection optical engine and an actual projection area of the projection optical engine is allowed to fully fall into the target projection area.

Similar to the previous embodiment, in this embodiment, based on the pinhole imaging principle that is satisfied between the position points on the plane and the points in the pixel area of the projection optical engine, which part of the area on the projective plane captured by the RGBD camera belongs to the projection area can be determined.

Considering that there may be occlusion in the projection environment, or the projection area is offset from the screen, etc., before keystone correction, the RGBD camera may be used to shoot an image of an area including the projection area, and a target projection area which is most suitable for projection may be identified in the image.

Figure 6A:
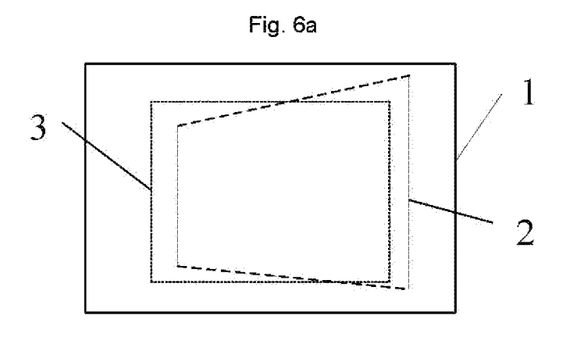
FIG. 6a is schematic diagram of a target projection area according to an embodiment of this application.
Figure 6B:
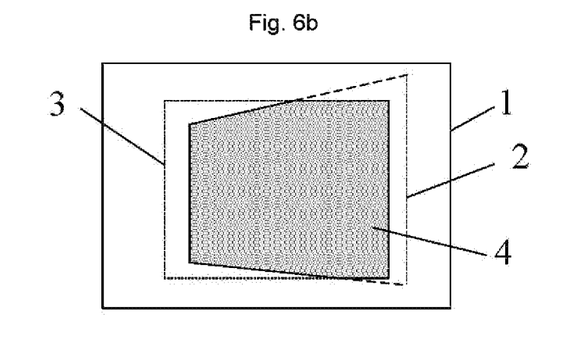
FIG. 6b is a schematic diagram of another target projection area according to an embodiment of this application.

For the target projection area, the description may refer to FIG. 6a and FIG. 6b. FIG. 6a is schematic diagram of a target projection area according to an embodiment of this application. FIG. 6b is a schematic diagram of another target projection area according to an embodiment of this application.

In FIG. 6a, in an image 1 captured by the RGBD camera, a pure-color area 3 is a target projection area, and a trapezoidal projection area 2 is an area where the projector can project a picture currently. Generally, an overlap area exists between the projection area 2 and the pure-color area 3. During keystone correction, pixels projected to the portion out of the target projection area by the projector may be invalid. The area where the projection optical engine can project can only be the overlap area between the target projection area and the projection area 2, in other words, the projection picture can only fall into the overlap area between the target projection area and the projection area 2 finally, and a rectangular screen is projected into the area.

In FIG. 6b, an overlap area between the pure-color area 3 and the trapezoidal projection area 3 in the image 1 is classified as a target projection area 4. During keystone correction, similarly, the projection picture fully falls into the target projection area 4, and a rectangular screen is projected.

The methods of performing keystone correction in FIGS. 6a and 6b are exactly the same, except that the area classifying of the target projection area is slightly different, and the process of implementing keystone correction is exactly the same.

It is to be noted that for the projection optical engine, there are two ways to adjust the area of a projection picture. One is to adjust the position, optical axis, and the like of the projector to realize moving the picture projected by the projection optical engine on a projective plane such as a screen. The other is to adjust the original image in the projector. For example, when a projection area of the projector is trapezoidal, the original image can be adjusted into a trapezoid. After the original image is projected by the projection optical engine, a rectangular picture can be displayed on the projection plane, and there is no need to adjust the optical axis of the projection optical engine.

Without changing the position and optical axis of the projection optical engine, a range of the area that the projection optical engine can project is determined, i.e., the projection area obtained based on the pinhole imaging principle in the above steps. The original image is subjected to certain adjustment, that is, part of the pixel area in the original image of the projection optical engine is invalid, so that an actual projection area can be contracted to a certain extent relative to the projection area, and finally a rectangular actual projection area is formed.

In this embodiment, when the projector is subjected to keystone correction, the actual projection area of the projection optical engine is contracted to the overlap area of the projection area and the pure-color area (or screen), thereby avoiding interference from obstructions in a projection environment and improving the projection effect of the projector.

Further, in another specific embodiment of this application, after the target projection area is determined, the plane fitting is performed and may specifically include the following steps.

Position points out of the target projection area are rejected.

Plane fitting is performed according to second coordinate values of position points located in the target projection area.

As mentioned above, the position points in this application are actually the position points in the image that the RGBD camera can capture. When all position points in the image captured by the RGBD camera are located on the same plane, a plane obtained by fitting according to the position points is necessarily a plane where the projection area is located. When there are occlusions in corner areas, or part of the area is a frame area of the curtain, the position points in the captured image are not all the position points on the projective plane. The second position coordinates of all the position points captured by the RGBD camera participate in plane fitting. The fitted plane cannot represent the plane where the projection area is located. When the fitted plane obtained based on the position points is subjected to keystone correction, it is apparent that accuracy of keystone correction may be reduced.

In addition, available location points in the current projection area of the projection optical engine are position points in the overlap part of the target projection area. The picture that the projector needs to project ultimately is required be located in the target projection area. Therefore, the position points in the target projection area can serve as a fitting basis to further exclude influences of the external environment on keystone correction.

Figure 7:
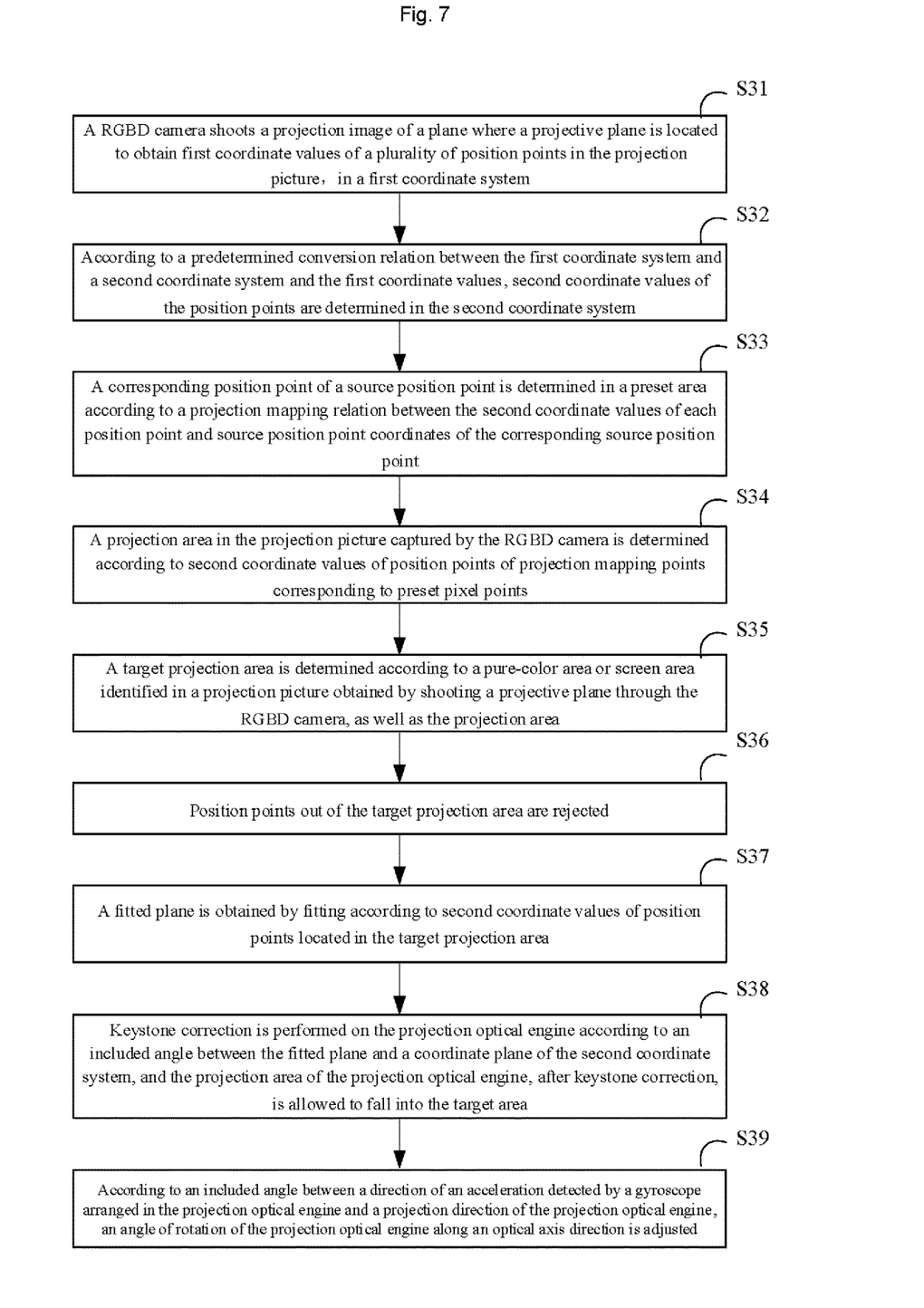
FIG. 7 is a schematic flowchart of a projector keystone correction method provided in another embodiment of this application.

Based on any of the foregoing embodiments, in another specific embodiment of this application, as shown in FIG. 7, which is a schematic flowchart of a projector keystone correction method according to an embodiment of the application, the method may include the following steps.

At S31, a RGBD camera shoots a projection image of a plane where a projective plane is located to obtain first coordinate values of a plurality of position points in the projection picture in a first coordinate system.

At S32, according to a predetermined conversion relation between the first coordinate system and a second coordinate system and the first coordinate values, second coordinate values of the position points are determined in the second coordinate system.

At S33, a corresponding position point of a source position point is determined in a preset area according to a projection mapping relation between the second coordinate values of each position point and source position point coordinates of the corresponding source position point.

The preset area refers to an area where the original pattern is located in the pixel coordinate system of the projection optical engine.

At S34, a projection area in the projection picture captured by the RGBD camera is determined according to second coordinate values of position points of projection mapping points corresponding to preset pixel points.

At S35, a target projection area is determined according to a pure-color area or screen area identified in a projection picture obtained by shooting a projective plane through the RGBD camera, as well as the projection area.

The projection area in the embodiment is the target projection area in FIG. 6*b*.

At S36, position points out of the target projection area are rejected.

At S37, a fitted plane is obtained by fitting according to second coordinate values of position points located in the target projection area.

At S38, keystone correction is performed on the projection optical engine according to an included angle between the fitted plane and a coordinate plane of the second coordinate system, and the projection area of the projection optical engine, after keystone correction, is allowed to fall into the target area.

At S39, according to an included angle between a direction of an acceleration detected by a gyroscope arranged in the projection optical engine and a projection direction of the projection optical engine, an angle of rotation of the projection optical engine along an optical axis direction is adjusted.

It is to be noted that the projection optical engine is corrected by using the RGBD camera to shoot an image of a projective plane, which can only ensure that the projected area of the projection optical engine is rectangular but cannot determine whether the projection picture of the projection optical engine rotates around the optical axis or not.

Thus, in the embodiment, a gyroscope is adopted to detect the optical axis direction of the projection optical engine. A rectangular coordinate axis of the gyroscope may be perpendicular to the optical axis of the projection optical engine or form other fixed included angle, which always remains unchanged. When the projection optical engine rotates around the optical center, the gyroscope rotates, correspondingly. The angle of rotation of the projection optical engine can be determined based on the direction of gravity detected by the gyroscope.

For example, at present, most projection optical engines project screens to a vertical plane. Under normal circumstances, the optical axis is parallel to the z-axis direction of the gyroscope and the direction of gravity is parallel to the x-axis direction. When the gyroscope detects that there is an included angle of 45 degrees between the direction of gravity and the x-axis direction, then it can be determined that the projection optical engine has rotated, and accordingly the projection optical engine can be subjected to adjustment.

The following describes the projector keystone correction apparatus according to an embodiment of this application. The projector keystone correction apparatus described below and the projector keystone correction methods described above can be referred to each other, correspondingly.

Figure 8:
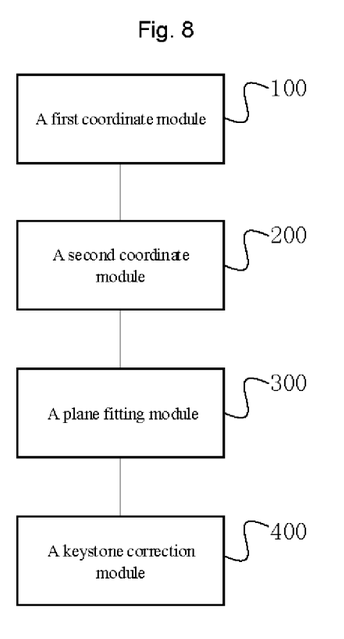
FIG. 8 is a structured flowchart of a projector keystone correction apparatus according to an embodiment of this application.

FIG. 8 is a structured flowchart of a projector keystone correction apparatus according to an embodiment of this application. Referring to FIG. 8, the projector keystone correction apparatus may include a first coordinate module 100, a second coordinate module 200, a plane fitting module 300, and a keystone correction module 400.

The first coordinate module 100 which is configured to obtain first coordinate values of a plurality of position points on a projective plane of a projection optical engine by shooting through an RGBD camera in a first coordinate system, wherein the first coordinate system is a space rectangular coordinate system in an optical system of the RGBD camera.

The second coordinate module 200 which is configured to determine second coordinate values of the position points in a second coordinate system, according to a predetermined conversion relation between the first coordinate system and the second coordinate system and the first coordinate values, wherein the second coordinate system is the space rectangular coordinate system in an optical system of the projection optical engine.

The plane fitting module 300 which is configured to perform plane fitting on the second coordinate values of the plurality of position points to obtain a fitted plane.

The keystone correction module 400 which is configured to perform keystone correction on the projection optical engine according to an included angle between the fitted plane and a coordinate plane of the second coordinate system.

Alternatively, in another specific embodiment of this application, the apparatus may further include a conversion relation module that is configured for predetermining the conversion relation and specifically includes a projective point unit, a coordinate unit, a correspondence relation unit, and a parameter unit.

The projective point unit which is configured to project an original image with feature points onto a projection screen through the projection optical engine in advance, to obtain projective points of the feature points on the projection screen.

The coordinate unit which is configured to obtain projective point first coordinate values of the projective points by shooting through the RGBD camera in the first coordinate system.

The correspondence relation unit which is configured to determine a correspondence relation between the projective point first coordinate values and feature point coordinate values as $(u,v)^T = F(R, t, f_x, f_y, c_x, c_y) \cdot (x, y, z)^T$ according to a pinhole imaging principle that is satisfied between the projective points and the feature points, as well as the conversion relation that is satisfied between the coordinate values, in the first coordinate system and the second coordinate system, of the projective points, wherein $(u,v)^T$ is a column vector of the feature point coordinate values of each feature point in a pixel coordinate system of the projection optical engine, $(x, y, z)^T$ is a column vector of the first coordinate values of each projective point, $F(R, t, f_x, f_y, c_x, c_y)$ is a function about $R, t, f_x, f_y, c_x, c_y$, $R$ and $t$ are conversion parameters of the conversion relation, $f_x$ and $f_y$ are respectively a focal length parameter expressed in pixels in an x-axis direction and a focal length parameter expressed in pixels in a y-axis direction of the projection optical engine, and $c_x$ and $c_y$ are respectively an optical center parameter in the x-axis direction and an optical center parameter in the y-axis direction of the projection optical engine.

The parameter unit which is configured to obtain a parameter $R, t, f_x, f_y, c_x, c_y$ according to the correspondence relation as well as multiple sets of the projective point first coordinate values and the feature point coordinate values.

Alternatively, in another specific embodiment of this application, the apparatus may further include a target area module and a keystone correction module.

The target area module which is configured to determine a projection area of the projection optical engine based on the pinhole imaging principle and the plurality of second coordinate values, identify a largest pure-color area or curtain area in a projective plane image captured by the RGBD camera, determine a target projection area of the projection optical engine, and execute the step of performing plane fitting on the second coordinate values of the plurality of position points.

The keystone correction module 400 which is specifically configured to perform keystone correction on the projection optical engine and allow an actual projection area of the projection optical engine to fully fall into the target projection area.

Alternatively, in another specific embodiment of this application, the plane fitting module 300 which is specifically configured to reject position points which are out of the target projection area; and perform plane fitting according to second coordinate values of position points within the target projection area.

Alternatively, in another specific embodiment of this application, the apparatus further includes a rotation correction module.

The rotation correction module which is configured to adjust an angle of rotation of the projection optical engine along an optical axis direction according to an included angle between a direction of an acceleration detected by a gyroscope arranged in the projection optical engine and a projection direction of the projection optical engine, after the projection optical engine is subjected to keystone correction based on the included angle between the fitted plane and the coordinate plane of the second coordinate system.

The projector keystone correction apparatus according to the embodiment is used for implementing the foregoing projector keystone correction method, and thus specific implementations of the projector keystone correction apparatus may refer to the embodiments of the projector keystone correction method described above. For example, a first coordinate module 100, a second coordinate module 200, a plane fitting module 300, and a keystone correction module 400 are respectively used for implementing steps S11, S12, S13, and S14 in the foregoing projector keystone correction method, respectively. Therefore, the specific implementations of the apparatus may refer to description of each corresponding embodiment, which will not be elaborated here.

This application further provides a projector keystone correction system, including a projection optical engine, a RGBD camera, and a processor.

The projection optical engine which is configured to project a projection picture.

The RGBD camera which is configured to shoot a plane where the projection picture is located.

The processor is connected to the projection optical engine and the RGBD camera and configured to perform operating steps of the projector keystone correction method according to any of the foregoing embodiments based on the picture captured by the RGBD camera.

In the embodiment, the RGBD camera and the processor capable of performing program operation cooperate to perform keystone correction on the projector. The operation program is simple and feasible, and keystone correction is high in accuracy and not easy to be affected by environments.

Alternatively, in another specific embodiment of this application, the system may further include the following.

The RGBD camera refers to any of a structured light camera, a tof camera, or a binocular camera.

Alternatively, in another specific embodiment of this application, the system may further include the following.

A gyroscope is arranged in the projector.

An angle of rotation of the projection optical engine in a direction perpendicular to an optical axis is detected through the gyroscope, thereby further improving quality of the projection picture.

This application further provides a computer-readable storage medium. A computer program stored in the computer-readable storage medium may be executed to implement the operating steps of the projector keystone correction method described in any of the foregoing embodiments.

Specifically, the computer-readable storage medium may be a Random Access Memory (RAM), an internal memory, a Read-Only Memory (ROM), an electrically programmable ROM, an electrically erasable programmable ROM, a register, a hard disk, a removable disk, a CD-ROM, or any other form of storage medium well known in the technical field.

In the specification, the various embodiments in this specification are described in a progressive manner, each embodiment is described with emphasis upon the differences from other embodiments, and the same or similar parts between the various embodiments can be referred to each other. For the apparatus disclosed in the embodiments, since the apparatus corresponds to the method disclosed in the embodiments, the description is relatively brief, and the relevant part can be explained with reference to the description of the method part.

Those of ordinary skill in the art may further realize that the units and steps of each method of each example described in combination with the embodiments disclosed in the disclosure may be implemented by electronic hardware, computer software or a combination of the two. For clearly describing interchangeability of hardware and software, the composition points and steps of each example have been generally described according to functions in the above descriptions. Whether these functions are executed in a hardware or software manner depends on specific applications and design constraints of the technical solutions. Those of ordinary skill in the art may realize the described functions for each specific application by virtue of different methods, but such realization shall fall within the scope of the disclosure.

What is claimed is:

1. A projector keystone correction method, comprising:
    using a Red, Green, Blue-Depth (RGBD) camera to shoot to obtain first coordinate values of a plurality of position points on a projective plane of a projection optical engine, in a first coordinate system, wherein the first coordinate system is a space rectangular coordinate system in an optical system of the RGBD camera;
    determining second coordinate values of the position points in a second coordinate system according to a predetermined conversion relation between the first coordinate system and the second coordinate system and the first coordinate values, wherein the second coordinate system is a space rectangular coordinate system in an optical system of a projection optical engine;
    performing plane fitting on the second coordinate values of the plurality of position points to obtain a fitted plane; and
    performing keystone correction on the projection optical engine according to an included angle between the fitted plane and a coordinate plane of the second coordinate system;
    wherein a process of predetermining the conversion relation comprises:
    projecting an original image with feature points onto a projection screen through the projection optical engine in advance, to obtain projective points of the feature points on the projection screen;
    using the RGBD camera to shoot to obtain projective point first coordinate values of the projective points, in the first coordinate system;
    determining a correspondence relation between the projective point first coordinate values and feature point coordinate values as $(u,v)^T = F(R,t,f_x,f_y,c_x,c_y) \cdot (x,y,z)^T$ according to a pinhole imaging principle that is satisfied between the projective points and the feature points as well as a conversion relation that is satisfied between the coordinate values of the projective points in the first coordinate system and the second coordinate system, wherein $(u,v)^T$ is a column vector of the feature point coordinate values of each feature point in a pixel coordinate system of the projection optical engine, $(x,y,z)^T$ is a column vector of the first coordinate values of each projective points, $F(R, t, f_x, f_y, c_x, c_y)$ is a function about $R, t, f_x, f_y, c_x, c_y$, R and t are conversion parameters of the conversion relation, $f_x$ and $f_y$ are respectively a focal length parameter expressed in pixels in an x-axis direction and a focal length parameter expressed in pixels in a y-axis direction of the projection optical engine, and $c_x$ and $c_y$ are respectively an optical center parameter in the x-axis direction and an optical center parameter in the y-axis direction of the projection optical engine; and
    according to the correspondence relation as well as multiple sets of the projective point first coordinate values and the feature point coordinate values, obtaining a parameter $R, t, f_x, f_y, c_x, c_y$;
    wherein after determining the second coordinate values, in the second coordinate system, of the position points, the method further comprises:
    determining a projection area of the projection optical engine based on the pinhole imaging principle and the plurality of second coordinate values;
    identifying a largest pure-color area or a curtain area in a projective plane image obtained by shooting through the RGBD camera, determining a target projection area of the projection optical engine, and executing the step of performing plane fitting on the second coordinate values of the plurality of position points; and
    performing keystone correction on the projection optical engine based on an included angle between the fitted plane and a coordinate plane of the second coordinate system comprising:
    performing keystone correction on the projection optical engine and allowing an actual projection area of the projection optical engine to fully fall into the target projection area.

2. The projector keystone correction method as claimed in claim 1, wherein performing plane fitting on the second coordinate values of the plurality of position points comprises:
    rejecting position points which are out of the target projection area; and
    performing plane fitting according to second coordinate values of position points within the target projection area.

3. The projector keystone correction method as claimed in claim 1, wherein after performing keystone correction on the projection optical engine based on an included angle between the fitted plane and a coordinate plane of the second coordinate system, the method further comprises:
    according to an included angle between a direction of an acceleration detected by a gyroscope arranged in the projection optical engine and a projection direction of the projection optical engine, adjusting an angle of rotation of the projection optical engine along an optical axis direction.

4. A projector keystone correction apparatus, comprising:
a first coordinate module which is configured to obtain first coordinate values of a plurality of position points on a projective plane of a projection optical engine by shooting through a Red, Green, Blue-Depth (RGBD) camera in a first coordinate system, wherein the first coordinate system is a space rectangular coordinate system in an optical system of the RGBD camera;
a second coordinate module which is configured to determine second coordinate values of the position points in a second coordinate system, according to a predetermined conversion relation between the first coordinate system and the second coordinate system, wherein the second coordinate system is a space rectangular coordinate system in an optical system of the projection optical engine;
a plane fitting module which is configured to perform plane fitting on the second coordinate values of the plurality of position points to obtain a fitted plane; and
a keystone correction module which is configured to perform keystone correction on the projection optical engine according to an included angle between the fitted plane and a coordinate plane of the second coordinate system;
wherein the apparatus comprises:
a conversion relation module, configured for predetermining the conversion relation the conversion relation module comprises a projective point unit, a coordinate unit, a correspondence relation unit, and a parameter unit;
the projective point unit, configured to project an original image with feature points onto a projection screen through the projection optical engine in advance, to obtain projective points of the feature points on the projection screen;
the coordinate unit, configured to obtain projective point first coordinate values of the projective points by shooting through the RGBD camera in the first coordinate system;
the correspondence relation unit, configured to determine a correspondence relation between the projective point first coordinate values and feature point coordinate values as $(u,v)^T = F(R, t, f_x, f_y, c_x, c_y) \cdot (x, y, z)^T$ according to a pinhole imaging principle that is satisfied between the projective points and the feature points, as well as the conversion relation that is satisfied between the coordinate values, in the first coordinate system and the second coordinate system, of the projective points, wherein $(u,v)^T$ is a column vector of the feature point coordinate values of each feature point in a pixel coordinate system of the projection optical engine, $(x, y, z)^T$ is a column vector of the first coordinate values of each projective point, $F(R, t, f_x, f_y, c_x, c_y)$ is a function about R, t, $f_x$, $f_y$, $c_x$, $c_y$, R and t are conversion parameters of the conversion relation, $f_x$ and $f_y$ are respectively a focal length parameter expressed in pixels in an x-axis direction and a focal length parameter expressed in pixels in a y-axis direction of the projection optical engine, and $c_x$ and $c_y$ are respectively an optical center parameter in the x-axis direction and an optical center parameter in the y-axis direction of the projection optical engine;
the parameter unit, configured to obtain a parameter R, t, $f_x$, $f_y$, $c_x$, $c_y$ according to the correspondence relation as well as multiple sets of the projective point first coordinate values and the feature point coordinate values;
wherein the apparatus comprises a hardware processor coupled with a memory and configured to execute program components stored on the memory;
wherein the apparatus comprises a target area module and a keystone correction module;
the target area module, configured to determine a projection area of the projection optical engine based on the pinhole imaging principle and the plurality of second coordinate values, identify a largest pure-color area or curtain area in a projective plane image captured by the RGBD camera, determine a target projection area of the projection optical engine, and execute the step of performing plane fitting on the second coordinate values of the plurality of position points;
the keystone correction module, configured to perform keystone correction on the projection optical engine and allow an actual projection area of the projection optical engine to fully fall into the target projection area.

5. A projector keystone correction system, comprising a projection optical engine, a Red, Green, Blue-Depth (RGBD) camera, and a processor, wherein
the projection optical engine is configured to project a projection picture;
the RGBD camera is configured to shoot a plane wherein the projection picture is located; and
the processor is connected to the projection optical engine and the RGBD camera and configured to perform operating steps of the projector keystone correction method as claimed in claim 1 based on the image captured by the RGBD camera.

6. The projector keystone correction system as claimed in claim 5, wherein the RGBD camera refers to any of a structured light camera, a tof camera, or a binocular camera.

7. The projector keystone correction system as claimed in claim 5, wherein a gyroscope is arranged in the projector.

8. A computer readable non-transitory storage medium, wherein a computer program stored in the computer-readable storage medium may be executed to implement operating steps of the projector keystone correction method as claimed in claim 1.

9. A projector keystone correction system, comprising a projection optical engine, a Red, Green, Blue-Depth (RGBD) camera, and a processor, wherein
the projection optical engine is configured to project a projection picture;
the RGBD camera is configured to shoot a plane wherein the projection picture is located; and
the processor is connected to the projection optical engine and the RGBD camera and configured to perform operating steps of the projector keystone correction method as claimed in claim 1 based on the image captured by the RGBD camera.

10. A projector keystone correction system, comprising a projection optical engine, a Red, Green, Blue-Depth (RGBD) camera, and a processor, wherein
the projection optical engine is configured to project a projection picture;
the RGBD camera is configured to shoot a plane wherein the projection picture is located; and
the processor is connected to the projection optical engine and the RGBD camera and configured to perform operating steps of the projector keystone correction method as claimed in claim 1 based on the image captured by the RGBD camera.

11. A projector keystone correction system, comprising a projection optical engine, a Red, Green, Blue-Depth (RGBD) camera, and a processor, wherein
the projection optical engine is configured to project a projection picture;
the RGBD camera is configured to shoot a plane wherein the projection picture is located; and
the processor is connected to the projection optical engine and the RGBD camera and configured to perform operating steps of the projector keystone correction method as claimed in claim 2 based on the image captured by the RGBD camera.

12. A projector keystone correction system, comprising a projection optical engine, a Red, Green, Blue-Depth (RGBD) camera, and a processor, wherein
the projection optical engine is configured to project a projection picture;
the RGBD camera is configured to shoot a plane wherein the projection picture is located; and
the processor is connected to the projection optical engine and the RGBD camera and configured to perform operating steps of the projector keystone correction method as claimed in claim 3 based on the image captured by the RGBD camera.

13. A computer readable non-transitory storage medium, wherein a computer program stored in the computer-readable storage medium may be executed to implement operating steps of the projector keystone correction method as claimed in claim 2.

14. A computer readable non-transitory storage medium, wherein a computer program stored in the computer-readable storage medium may be executed to implement operating steps of the projector keystone correction method as claimed in claim 3.

* * * * *